8384X
C. Mc Gregory,
Jointing Staves,
Patented Aug. 26, 1834.
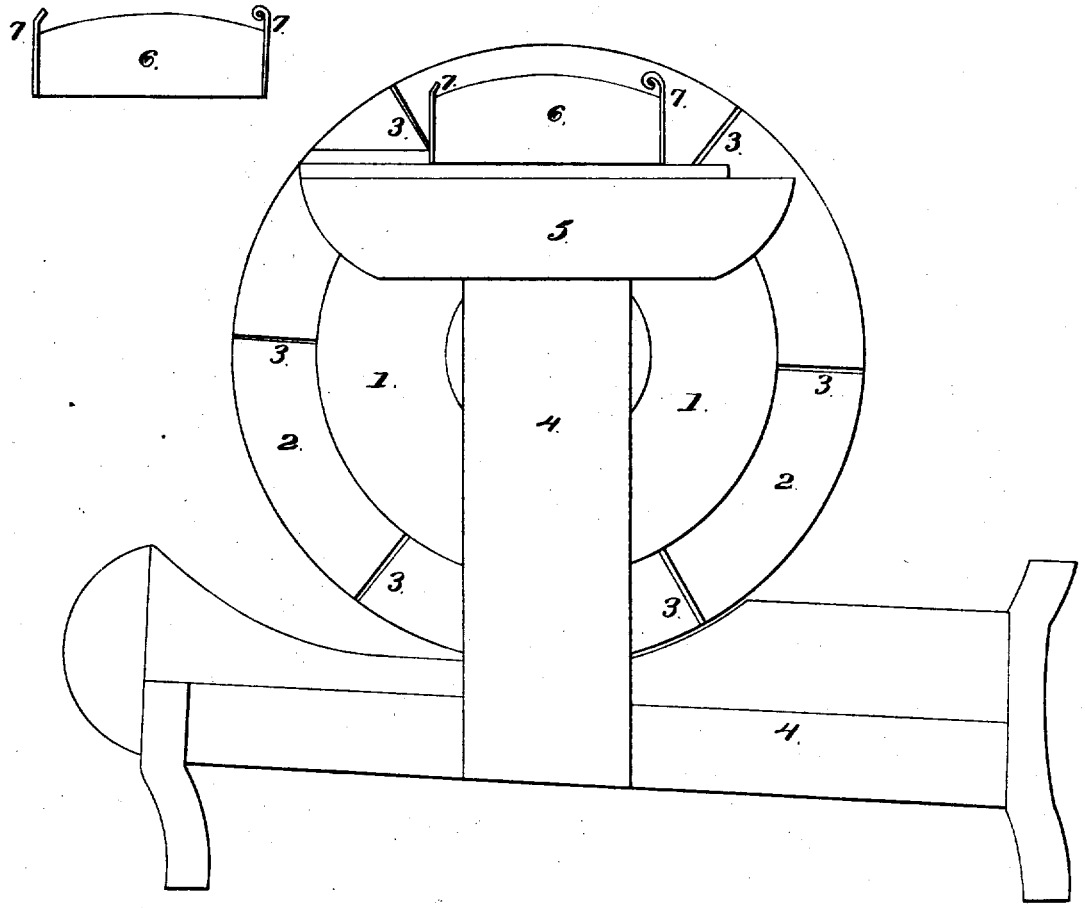
AM. PHOTO-LIT'HO. CO. N.Y. (OSBORNE'S PROCESS)

[illegible]

Aug 26. 1834

Cyrus Mc Gregory of Newport. State of New Hampshire

Letters Patent,

The schedule referred to in these Letters Patent and making part of the same containing a description in the words of the said Cyrus McGregory, himself, of his improvement in the mode of jointing making or manufacturing Staves for Barrels, Hogsheads, or other Casks          To all persons to whom these presents shall come Cyrus McGregory of Newport, in the County of Sullivan, and State of New Hampshire, Cooper sends Greeting., Be it known that I the said Cyrus McGregory, have invented constructed, made, and applied to use, a new and useful improvement in the mode of Jointing, Making, and Manufacturing staves for barrels hogsheads, and other casks called the revolving or wheel jointer and gage, specified in the words following viz. This improvement consists in the application of a gage to a perpendicular or revolving wheel jointer, made to revolve by water, horse, steam, or other power, as represented by the drawing hereunto annexed, in which Fig 1 - 1. represents the central circular plate on the front part of the wheel, which is fixed and made to keep stationary; being fastened to the post, in front that supports one end of the axletree of the wheel the other end being supported by another post behind the wheel, and behind the wheel as in the model deposited in the Patent office of the United States of America, being smal than the front wheel there is a small wheel, for a band to be applied to put both in motion.

Fig. 6. represents the front of the outer circle or the face of the jointer wheel which is in the same plane with the fa of the stationary circular plate, above described, and being put motion by a power, as above described or by other means, with proper plain irons inserted, and well set as represented in the draft annexed by Fig 3 of which there ought to be from six to to eight or twelve, as they are in some parts of the stave, to cut across the grain of the wood, and aught not to be set so as to take any rank hold; but the number of irons to be set, may be varied at the pleasure of the builder or user. The above named circular jointer face, revolves, while the said plate remains stationary. The back parts of the wheel revolving with the jointer face Fig 4. represents the platform and front post which supports one end of the axle tree of the wheel, and a horizontal cap about one half the distance above the centre of the wheel toward the circumference Fig 5. represents said horizontal cap Fig 6. represents the gage one of which on said plane annexed is separate at the left of the wheel, this gage must be so constructed that its length is equal to the length of the cask for which the staves to be jointed are intended, and that its depth or width, may be equal to the semi-diameter of the cask, that the staves to be jointed are intended for, And its top part should be circular or crowning, according to the degree or extent that the bung diameter of the cask exceeds the end diameter, that is to say if the bung diameter of the cask is to exceed the end diameter by two inches, the diameter of the gage at the middle must exceed the end diameter of the gage by one inch, if three inches in the cask, then one inch and a half in the gage, so that the gage may represent one half of a longitudinal section of a cask, through the centre of the cask not regarding any other part of said section but the plane or surface. — At the upper left hand corner of the gage, at fig. 7. there is a catch to hold one end of the stave This catch may be made of wood iron or other material vary much according to the wishes of the user, but iron or steel is best, at the opposite corner of the gage at fig 7. also there is a spring with a catch so that by placing one end of a stave in the catch at the other end, and bending the stave with that surface down on the top of the gage, the spring on the other end of the gage will receive the other end of the stave and hold it steady, to be applied to the jointer wheel, and be jointed
by then moving the spring, the stave may then be released, and another
bent in and jointed, and so on. The spring may be of wood, iron,
steel, or other material, but steel is best. The gage may be
made of wood which is best; but it may be made of brass, Iron or
other material. - In the model aforesaid the gage is of brass
being small. When the stave is attached to the gage, it is applied
to the jointer wheel, by placing the lower edge of the gage in a
small groove in the horizontal beam as by fig. 5, in the same
plane with the face of the revolving jointer. The size and di-
ameter of the wheel should be in proportion to the size of the casks
that the staves are intended for. For barrel staves, the di-
ameter of the wheel ought to be about nine feet, and for other
casks in proportion, The principle on which this improvement is constructed is
that when the stave is bent on the upper surface or edge of
the gage the bilge part of the stave is as much further from the
centre of the circle of which the semi diameter of the cask, forms
a segment, than the ends, as the bilge is deeper than the
ends of the cask, as also the outside of the stave is further
from the axis of the cask, represented by the lower edge of the
gage, than the inside part of the stave. This gage thus appli-
ed, gives both the true bilge, and bevel to the staves when
jointed. —— This improvement, then, consists in the con-
struction and application of said gages, for holding and
gaging the staves to the revolving jointer, which wheel or
revolving jointer is not my invention but has never before
been applied to jointing staves for casks. — In testimony
that the above ^named specification of my said improvement as above
described I have hereunto set my hand, this seventeenth
day of December A. D. 1833

Witness Amos Eddy
Sarah H. Eddy

Cyrus McGregory

[illegible]

1128 118,

Drawing